United States Patent [19]

Nakajima et al.

[11] Patent Number: 5,657,299
[45] Date of Patent: Aug. 12, 1997

[54] MAGNETO-OPTICAL RECORDING MEDIUM

[75] Inventors: Junsaku Nakajima, Kashihara; Yoshiteru Murakami, Nishinomiya; Akira Takahashi, Nara, all of Japan

[73] Assignee: Sharp Kabushiki Kaisha, Osaka, Japan

[21] Appl. No.: 588,629

[22] Filed: Jan. 19, 1996

[30] Foreign Application Priority Data

Feb. 21, 1995 [JP] Japan ................................. 7-031911

[51] Int. Cl.$^6$ .............................. G11B 11/00; G11B 5/66
[52] U.S. Cl. ..................... 369/13; 360/114; 428/694 MM
[58] Field of Search .................................. 369/13, 275.2, 369/275.3, 286, 14, 110, 116; 360/59, 114; 428/694 ML, 694 MM, 694 EC, 900

[56] References Cited

U.S. PATENT DOCUMENTS

| | | | |
|---|---|---|---|
| 5,163,031 | 11/1992 | Osato | 369/13 |
| 5,258,973 | 11/1993 | Iida | 369/275.2 |
| 5,458,987 | 10/1995 | Sato et al. | 428/694 EC |
| 5,493,545 | 2/1996 | Matsumoto | 369/13 |
| 5,585,200 | 12/1996 | Sato et al. | 428/694 ML |
| 5,596,555 | 1/1997 | Osato et al. | 369/13 |

FOREIGN PATENT DOCUMENTS 6-259827  9/1994  Japan .

OTHER PUBLICATIONS

J. Nakajima, et al., "Center Aperture Detection with Readout Magnetic Field", *Proceedings of Magneto–Optical Recording International Symposium*, 1994, (J. Magn. Soc. Jpn., vol. 19, Supplement No. S1, 1995, pp. 445–446).

J. Nakajima, et al., "New Magnetically Induced Super Resolution Disk by Using Exchange–Coupled Magnetic Layers", *IEEE Transactions on Magnetics*, vol. 31, No. 6, Nov. 1995.

*Primary Examiner*—Ali Neyzari
*Attorney, Agent, or Firm*—David G. Conlin; Brian L. Michaelis

[57] ABSTRACT

A magneto-optical recording medium has magnetic multi-layers including a reproductive layer, which is a magnetic layer having perpendicular magnetic anisotropy, for reading out magneto-optically recorded information and a recording layer, which is a magnetic layer having perpendicular magnetic anisotropy, for magneto-optically recording information. In the magneto-optical recording medium, the following conditions are fulfilled:

$$H_{C1}(ta) + \sigma w(ta)/2M_{S1}(ta)h_1$$

$$< -H_{C1}(t) + \sigma w(t)/2M_{S1}(t)h_1, \text{ and}$$

$$40(nm) \leq h_1 \leq 120(nm)$$

where $h_1$ is the thickness of the reproductive layer, $H_{C1}(ta)$ is coercive force of the reproductive layer at room temperature (ta), $M_{S1}(ta)$ is saturation magnetization of the reproductive layer, $M_{S2}(ta)$ is saturation magnetization of the recording layer, $\sigma w(ta)$ is magnetic domain wall energy of the magnetic domain wall formed between said reproductive layer and the recording layer, $H_{C1}(t)$ is coercive force of the reproductive layer at a temperature (t) of not lower than a certain temperature (tm) that is higher than room temperature, $M_{S1}(t)$ is saturation magnetization of the reproductive layer, $M_{S2}(t)$ is saturation magnetization of the recording layer, and $\sigma w(t)$ is magnetic domain wall energy of the magnetic domain wall formed between the reproductive layer and the recording layer.

8 Claims, 4 Drawing Sheets

MAGNETO-OPTICAL RECORDING MEDIUM

FIELD OF THE INVENTION

The present invention relates to magneto-optical recording media, such as a magneto-optical disk, a magneto-optical tape, and magneto-optical card that are applied to a magneto-optical recording apparatus.

BACKGROUND OF THE INVENTION

As a rewritable optical disk, magneto-optical recording disks have been researched and developed, and some of them have had already practical application as an external memory of a computer.

Since a magneto-optical disk, that uses a perpendicular magnetization film as a recording medium, records/reproduces information by utilizing a light, its recording capacity can be enlarged compared to a floppy disk or a hard disc using an in-plane magnetization film. However, the recording density of the magneto-optical disk is limited by a size of a light beam spot on the magneto-optical disk. This is because when a recording bit diameter and intervals of recording bits become smaller than the size of the light beam spot, a plurality of bits enter the light beam spot, thereby making it impossible to reproduce each recording bit separately.

In order to reduce the beam spot so that the recording density is improved, it is effective to shorten a wavelength of the laser light. However, the shortest wavelength of a semiconductor laser on the market is 680 nm, and a semiconductor laser having a shorter wavelength is now being developed. Therefore, it is difficult to further improve the recording density of a magneto-optical disk by using a laser that is now on the market.

On the contrary, for example, "Journal of Magnetic Society of Japan, vol. 19 Supplement No. S1 (1995), pp. 445–446" describes that when a magneto-optical disk having two magnetic layers, namely, a recording layer and a reproductive layer is used for reproduction as a magnetic field is being applied, bits that is smaller than the light beam spot can be read out, thereby making it possible to improve the recording density.

However, in the above method for carrying out reproduction while a magnetic field is being applied in the above manner, since a comparatively strong magnetic field of not less than 800 (Oe) is required for the reproduction, in the case where an electromagnet is used as a magnetic field generating unit, a lot of power consumption is required. Moreover, in the case where a permanent magnet is used as the magnetic field generating unit considering power consumption, there arises a problem that the size of the apparatus is enlarged.

SUMMARY OF THE INVENTION

It is an object of the present invention to provide a magneto-optical recording medium in which a magnetic field required for reproduction can be decreased, power consumption is small and a permanent magnet that prevents miniaturization of a magnetic field generating unit is not required.

In order to achieve the above object, a first magneto-optical recording medium of the present invention has magnetic multi-layers composed of a reproductive layer, which is a magnetic layer having perpendicular magnetic anisotropy, for reading out magneto-optically recorded information and a recording layer, which is a magnetic layer having perpendicular magnetic anisotropy, for magneto-optically recording information. The magneto-optical recording medium is characterized in that the following conditions are fulfilled:

$$H_{C1}(ta)+\sigma w(ta)/2M_{S1}(ta)h_1$$

$$<-H_{C1}(t)+\sigma w(t)/2M_{S1}(t)h_1; \text{ and}$$

$$40(nm) \leq h_1 \leq 120(nm)$$

where $h_1$ is the thickness of the reproductive layer, $H_{C1}(ta)$ is coercive force of said reproductive layer at room temperature (ta), $M_{S1}(ta)$ is saturation magnetization of the reproductive layer at room temperature (ta), $M_{S2}(ta)$ is saturation magnetization of the recording layer at room temperature (ta), $\sigma w(ta)$ is magnetic domain wall energy of a magnetic domain wall formed between the reproductive layer and the recording layer at room temperature (ta), $H_{C1}(t)$ is coercive force of the reproductive layer at a temperature (t) of not lower than a certain temperature (tm) that is higher than room temperature, $M_{S1}(t)$ is saturation magnetization of the reproductive layer at a temperature (t) of not lower than a certain temperature (tm) that is higher than room temperature, $M_{S2}(t)$ is saturation magnetization of the recording layer at a temperature (t) of not lower than a certain temperature (tm) that is higher than room temperature, and $\sigma w(t)$ is magnetic domain wall energy of a magnetic domain wall formed between the reproductive layer and the recording layer at a temperature (t) of not lower than a certain temperature (tm) that is higher than room temperature.

In addition, a second magneto-optical recording medium of the present invention, which is the first magneto-optical recording medium, is characterized in that the following condition is fulfilled:

$$1 \times 10^{-4} (J/m^2) \leq \sigma w(ta) \leq 1 \times 10^{-3} (J/m^2).$$

In addition, a third magneto-optical recording medium of the present invention, which is the first or second magneto-optical recording medium, is characterized in that the following condition is fulfilled:

$$M_{S1}(ta) \leq 0.2(T).$$

In addition, a fourth magneto-optical recording medium of the present invention, which is the first or second magneto-optical recording medium, is characterized in that the recording layer has composition that transition metal sub-lattice magnetization is superior to rare earth metal sub-lattice magnetization at room temperature and that the following condition is fulfilled:

$$M_{S2}(ta) \geq 0.06(T).$$

In addition, a fifth magneto-optical recording medium of the present invention, which is the first or second magneto-optical recording medium, is characterized in that the recording layer has composition that transition metal sub-lattice magnetization is superior to rare earth metal sub-lattice magnetization at room temperature and that the following conditions are fulfilled:

$$M_{S1}(ta) \leq 0.2(T); \text{ and}$$

$$M_{S2}(ta) \geq 0.06(T).$$

In accordance with the above arrangements, the range of strength of the magnetic field required for the reproduction is set according to the coercive force, thickness and saturation magnetization of the reproductive layer, and the magnetic domain wall energy stored in the interface between the reproductive layer and the recording layer. Therefore, since the magneto-optical recording medium of the present invention has the arrangement that fulfills the above-mentioned conditions, the applied magnetic field required for the reproduction can be decreased. As a result, less power consumption in the recording/reproducing apparatus can be realized. Moreover, since a small-sized electromagnet can be used as the magnetic field generating unit, miniaturization of the whole apparatus can be realized.

For fuller understanding of the nature and advantages of the invention, reference should be made to the ensuing detailed description taken in conjunction with the accompanying drawings.

DETAILED DESCRIPTION OF THE PREFERRED EMBODIMENTS

EMBODIMENT 1

Figure 1:
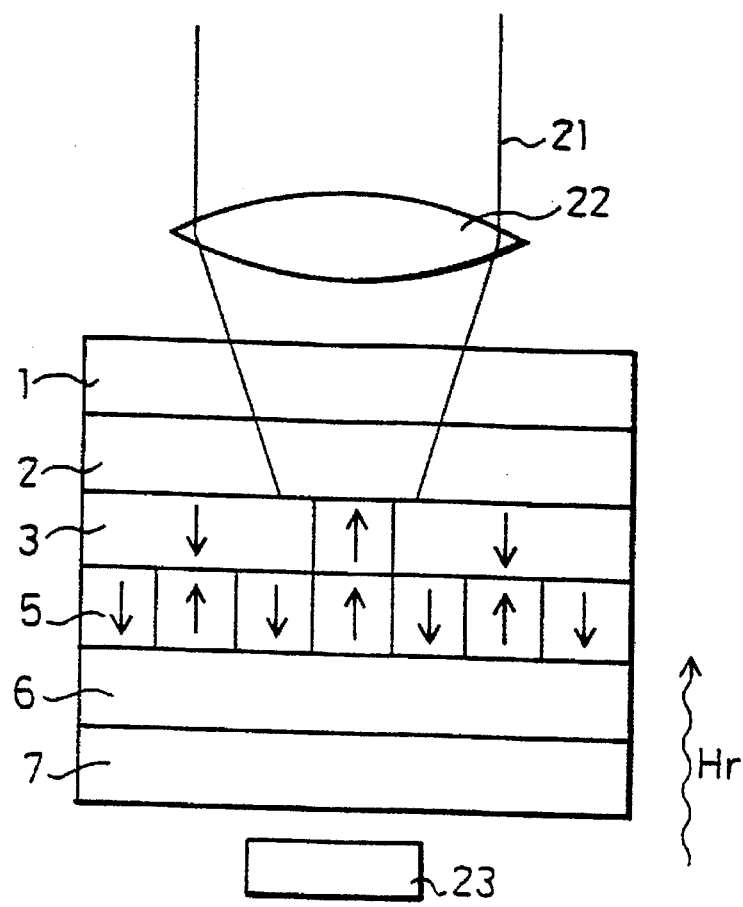
FIG. 1 is an explanatory drawing which shows an arrangement and a reproducing operation of a magneto-optical disk according to one embodiment of the present invention.
Figure 2:
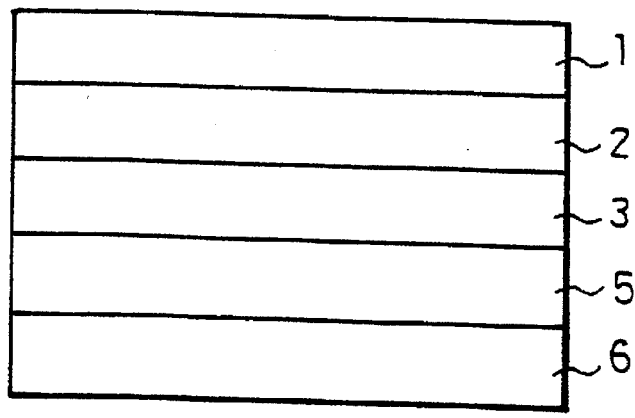
FIG. 2 is an explanatory drawing which shows a schematic arrangement of the magneto-optical disk in FIG. 1.

As shown in FIG. 1, a magneto-optical disk (magneto-optical recording medium) of the present embodiment is arranged such that a substrate 1, a transparent dielectric layer 2, a reproductive layer 3, a recording layer 5, a protective layer 6 and an over coat layer 7 are laminated in this order. A reproducing light beam 21 irradiates the reproductive layer 3 via an objective lens 22, and a magnet 23 is positioned in an opposite position to the objective lens 22 across the magneto-optical disk. As a sample having magnetic double layers, the magneto-optical disk was formed such that the transparent dielectric layer 2 made of AlN with thickness of 70 nm, the reproductive layer 3 in which its thickness is variously changed, the recording layer 5 with thickness of 50 nm and the protective layer 6 with thickness of 50 nm that is a dielectric film made of AlN were laminated on the glass substrate 1.

GdFeCo rare earth transition metal alloy that is a ferrimagnetic material with compensation temperature of 180° C. and Curie temperature of 330° C. was used as the reproductive layer 3. DyFeCo rare earth transition metal alloy that is a ferrimagnetic material with compensation temperature of room temperature and Curie temperature of 240° C. was used as the recording layer 5.

Figure 3:
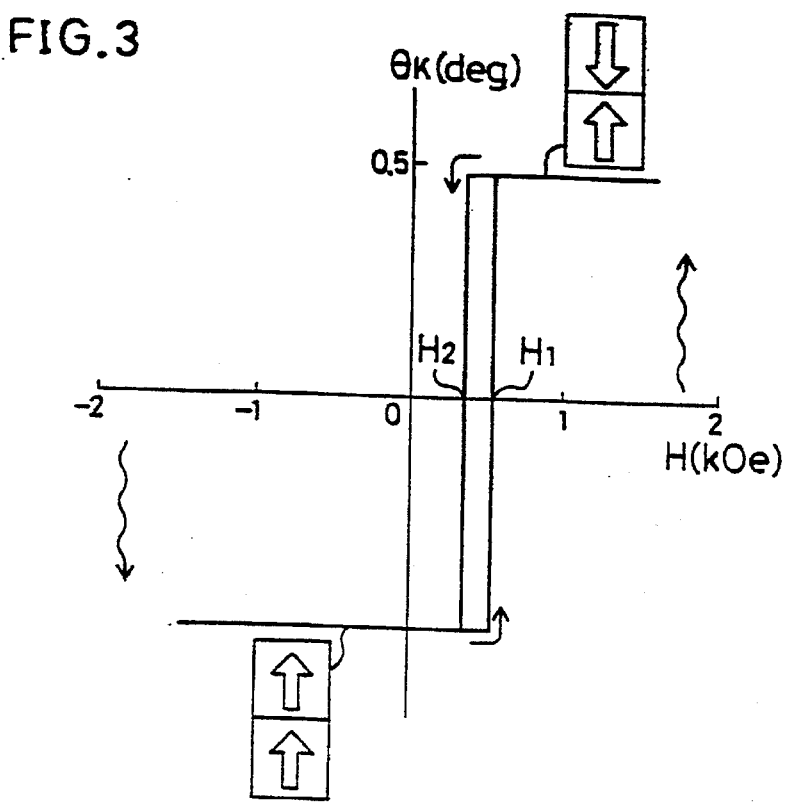
FIG. 3 is a graph which shows a Kerr hysteresis loop at room temperature viewed from a reproductive layer side of magnetic double layers in the magneto-optical disk of FIG. 2.
Figure 4:
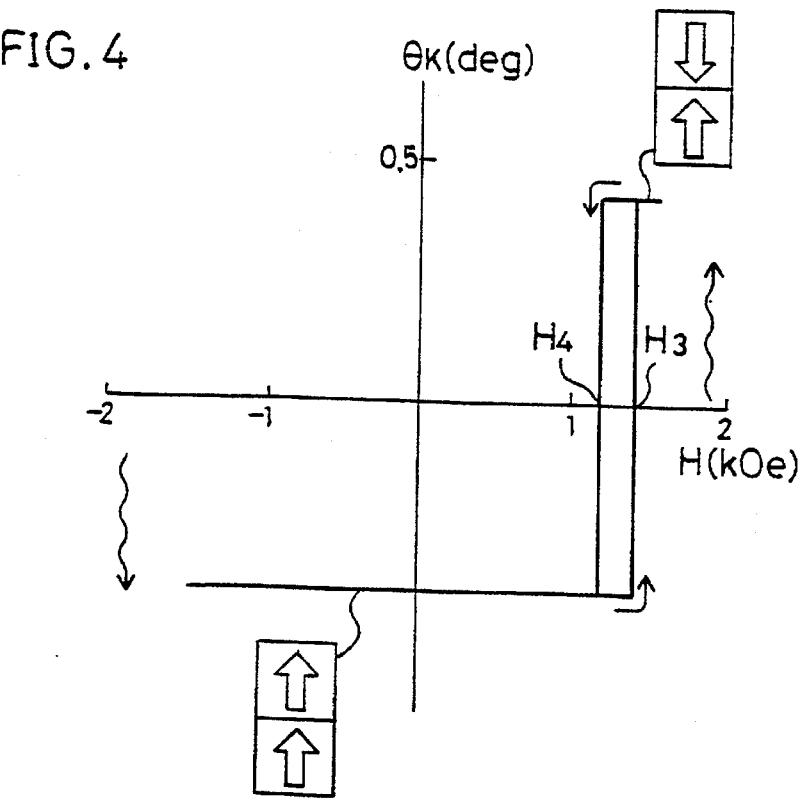
FIG. 4 is a graph which shows a Kerr hysteresis loop at 160° C. viewed from the reproductive layer side of the magnetic double layers in the magneto-optical disk of FIG. 2.

FIGS. 3 and 4 respectively show Kerr hysteresis loops at room temperature and at 160° C. that were measured when a light with wavelength of 630 nm is irradiated onto the reproductive layer 3 with thickness of 50 nm made of GdFeCo, that is chosen from the samples having magnetic double layers, from the glass substrate 1 side. The horizontal axis represents an external magnetic field to be applied and the vertical axis represents a Kerr rotation angle. The arrows shown by a solid line represent directions where locus of the loops is drawn. The arrows shown by an outline typeface explanatorily represent transition metal sub-lattice magnetization directions in the magnetic double layers in a typical magnetic field: the upside arrows represent the transition metal sub-lattice magnetization of the reproductive layer 3 made of GdFeCo; and the downside arrows represent the transition metal sub-lattice magnetization of the recording layer 5 made of DyFeCo. Moreover, the arrows shown by wavy lines represent a direction of the external magnetic field. When the external magnetic field is positive, the magnetic field is applied perpendicularly to the film surface in the upward direction. When the external magnetic field is negative, the magnetic field is applied perpendicularly to the film surface in the downward direction. The arrows shown by an outline typeface show the transition metal sub-lattice magnetization directions according to the directions of the external magnetic field. The external magnetic field was changed in the range of −1.5 kOe to +1.5 kOe. FIG. 3 shows the result at room temperature, and FIG. 4 shows the result at 160° C.

As shown in FIG. 3, the transition metal sub-lattice magnetization of the reproductive layer 3 points downward when the external magnetic field of not less than $H_1$ at room temperature is perpendicularly applied in the upward direction. This is because rare earth metal sub-lattice magnetization is superior to the transition metal sub-lattice magnetization at room temperature in the reproductive layer 3. For this reason, when the magnetization follows the external magnetic field, the transition metal sub-lattice magnetization points the opposite direction to the external magnetic field.

Meanwhile, when the magnetic field is not more than $H_2$ that is smaller than $H_1$, the transition metal sub-lattice magnetization of the reproductive layer 3 points upward according to exchange coupling force between the reproductive layer 3 and the recording layer 5.

In FIG. 3, the transition metal sub-lattice magnetization of the recording layer 5 points the same direction in all the external magnetic fields, namely, the upward direction in the drawing. This is because the compensation temperature of the recording layer 5 is room temperature. For this reason, the magnetization is not reversed even if the external magnetic field is changed in the range of $-1.5 \leq H \leq 1.5$ (kOe).

In addition, when the external magnetic field of not less than $H_3$ is applied to the reproductive layer 3 in the perpendicular direction at 160° C., as shown in FIG. 4, the transition metal sub-lattice magnetization of the reproductive layer 3 points downward according to the external magnetic field. Moreover, in the external magnetic field of not more than $H_4$, the transition metal sub-lattice magnetization of the reproductive layer 3 points upward according to the exchange coupling force between the reproductive layer 3 and the recording layer 5.

In FIG. 4, the transition metal sub-lattice magnetization of the recording layer 5 points the same direction in all the external magnetic fields, namely, the upward direction in the drawing. This is because the compensation temperature of the recording layer 5 is room temperature and the magnetization is not reversed even if the external magnetic field is changed in the range of $-1.5 \leq H \leq 1.5$ (kOe).

At the time of the reproducing operation, the reproducing light beam 21 shown in FIG. 1 is irradiated on the reproductive layer 3 via the objective lens 22 from the substrate 1 side. In the area of the reproductive layer 3 on which the reproducing light beam 21 was irradiated, the temperature rises highest in the vicinity of its central portion so as to be higher than that of the circumferential portion. This is because since the reproducing light beam 21 is converged up to the diffraction limit by the objective lens 22, its light intensity has Gaussian distribution and the temperature of the light beam irradiated portion on the magneto-optical disk has approximately Gaussian distribution.

When the temperature in the vicinity of the center portion rises and the intensity of the reproducing light beam 21 is set so that the circumferential portion has a temperature that is near room temperature, only the area of the vicinity of the center portion that is smaller than the light beam diameter takes part in reproduction. This is because as shown in FIG. 4, the area of the vicinity of the central portion where the temperature of the reproductive layer 3 rises has a characteristic that the sub-lattice magnetization direction is changed by the external magnetic field of not less than $H_3$ or not more than $H_4$, meanwhile the circumferential portion has a characteristic that the sub-lattice magnetization direction is changed by the external magnetic field of not less than $H_1$ or not more than $H_2$ as shown in FIG. 3.

Therefore, when an external magnetic field Hr that is stronger than $H_1$ and weaker than $H_4$ is applied by the magnet 23, the transition metal sub-lattice magnetization in the vicinity of the central portion on the light beam irradiated portion of the reproductive layer 3 points a direction according to the exchange coupling force from the recording layer 5 because the external magnetic field Hr is weaker than $H_4$, and the transition metal sub-lattice magnetization on the circumferential portion points a direction according to the external magnetic field Hr applied from the magnet 23 because the external magnetic field Hr is stronger than $H_1$.

The magnetic double layers used in the present embodiment fulfill the following relationship:

$$H_1 < H_4 \quad (1)$$

therefore, when the external magnetic field Hr that fulfill the following relationship:

$$H_1 < Hr < H_4 \quad (2)$$

is applied at the time of the reproduction, information of the recording layer 5 is transferred onto only the vicinity of the central portion of the reproductive layer 3 where the temperature is raised by the reproducing light beam 21, so only the vicinity of the central portion takes part in the reproduction. In other words, the transition metal sub-lattice magnetization on the portion of the reproductive layer 3 other than the portion where the temperature rises masks the information of the recording layer 5.

Then, the reproducing light beam 21 moves. Actually, the magneto-optical disk rotates. When the next recording bit is reproduced, the temperature of the reproduced portion is lowered nearly to room temperature, so the transition metal sub-lattice magnetization of the reproductive layer 3 does not follow the transition metal sub-lattice magnetization of the recording layer 5, so it points the direction according to the external magnetic field Hr similarly to the circumferential portion. For this reason, the reproduced portion is masked.

$H_1$ and $H_4$ respectively fulfill the following relationship:

$$H_1 = H_{C1}(\text{room temperature})/2M_{S1}(\text{room temperature}) \cdot h_1 \quad (3)$$

$$H_4 = -H_{C1}(160° C.) + \sigma w(160° C.)/2M_{S1}(160° C.) h_1 \quad (4)$$

in which $h_1$ is the thickness of the reproductive layer 3, $H_{C1}$(room temperature) is the coercive force of the reproductive layer 3 at room temperature, $M_{S1}$ (room temperature) is the saturation magnetization of the reproductive layer 3, $\sigma w$(room temperature) is magnetic domain wall energy of a magnetic domain wall formed between the reproductive layer 3 and the recording layer 5 at room temperature, $H_{C1}$(160° C.) is the coercive force of the reproductive layer 3 at 160° C., $M_{S1}$(160° C.) is the saturation magnetization of the reproductive layer 3 at 160° C., and $\sigma w$(160° C.) is magnetic domain wall energy of a magnetic domain wall formed between the reproductive layer 3 and the recording layer 5 at 160° C. When the equations (3) and (4) are substituted into the expression (2), $$H_{C1}(\text{room temperature}) + \sigma w(\text{room temperature})/2M_{S1}(\text{room temperature}) h_1 < Hr < -H_{C1}(160° C.) + \sigma w(160° C.)/2M_{S1}(160° C.) h_1 \quad (5)$$

According to the above expression (5), the range of the external magnetic field Hr is set. Moreover, according to the expression (1), the double layers used in the magneto-optical disk should fulfill the following relationship:

$$H_{C1}(\text{room temperature}) + \sigma w(\text{room temperature})/2M_{S1}(\text{room temperature}) h_1 < -H_{C1}(160° C.) + \sigma w(160° C.)/2M_{S1}(160° C.) h_1 \quad (6).$$

The external magnetic field Hr, that should be applied at the time of the reproduction so that the above phenomenon is realized, can be evaluated by investigating the values of $H_1$ and $H_4$. TABLE 1 shows the results of measuring the values of $H_1$ and $H_4$ when the thickness of the reproductive layer 3 is changed.

TABLE 1

| Thickness of reproductive layer (nm) | $H_1$ (kOe) | $H_4$ (kOe) |
| --- | --- | --- |
| 20 | 3.0 | >2 |
| 30 | 1.0 | >2 |
| 40 | 0.60 | 1.50 |
| 50 | 0.55 | 1.20 |
| 60 | 0.53 | 1.05 |
| 70 | 0.50 | 0.91 |
| 80 | 0.46 | 0.80 |
| 90 | 0.43 | 0.69 |
| 100 | 0.40 | 0.63 |
| 110 | 0.38 | 0.58 |
| 120 | 0.36 | 0.55 |
| 130 | 0.35 | 0.48 |
| 140 | 0.32 | 0.43 |
| 150 | 0.30 | 0.40 |

According to TABLE 1, when the thickness of the reproductive layer 3 is not less than 40 nm, the reproduction can be carried out by applying the external magnetic field of comparatively small value. Moreover, according to International Standard 10089 (ISO 5.25 "Rewriting-type Optical Disk"), it is provided that the magnetic field to be applied is not more than 600 (Oe). Therefore, when this standard is considered, the thickness of the reproductive layer 3 should be not less than 40 nm.

Figure 5:
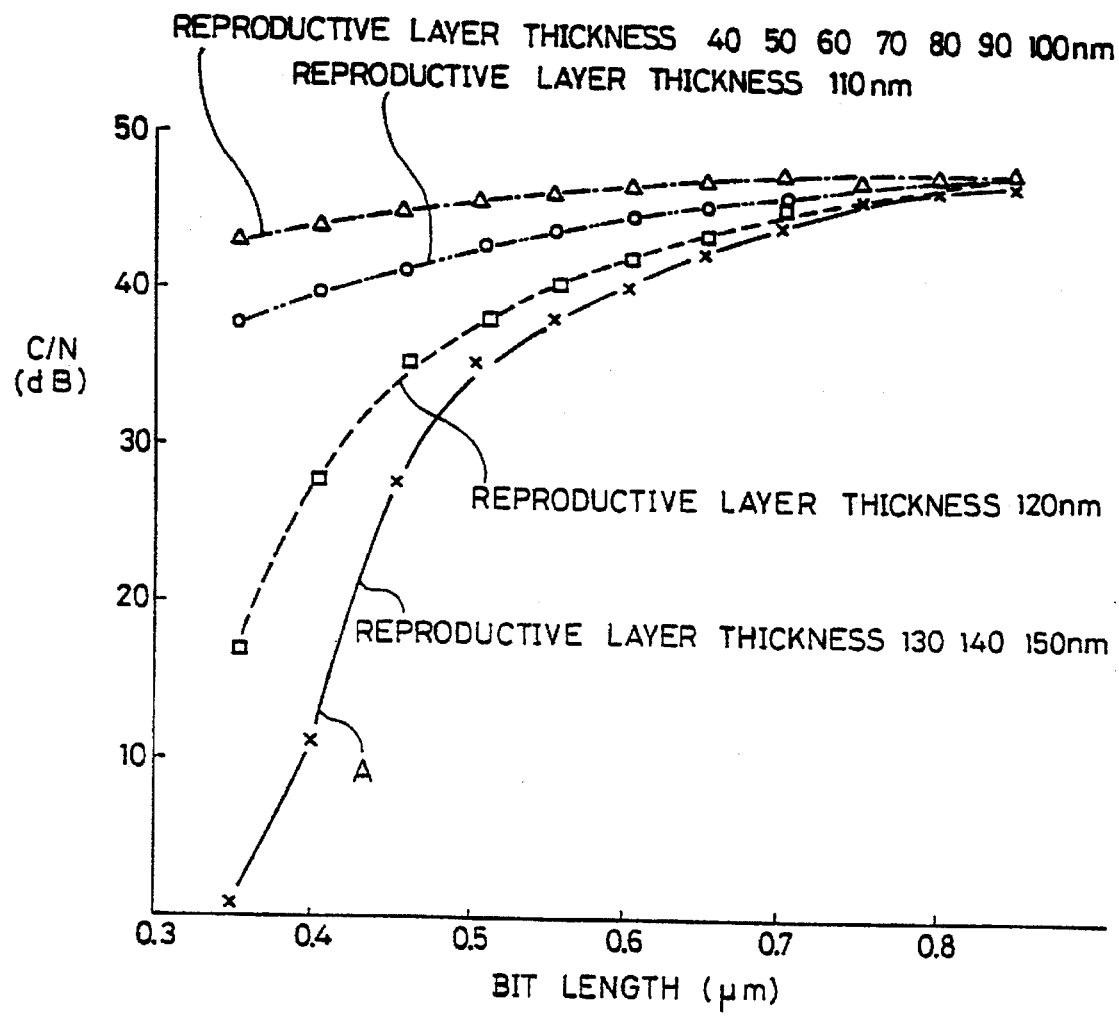
FIG. 5 is a graph which shows results of measuring a relationship between a C/N value and a bit length according to embodiment 1 by varying the thickness of the reproductive layer.

In addition, the graph of FIG. 5 shows a relationship between the length of the recording bits and quality of a reproductive signal (C/N). In this experiment, a linear velocity of the disk is set to 5 m/sec, and recording was carried out while a recording frequency was being varied so that its C/N was measured. A wavelength of a semiconductor laser of an optical pick-up was 780 nm, a numerical aperture (N.A.) of the objective lens was 0.55. The reproducing laser power was 2.5 mW, and the values of the external magnetic field applied at the time of the reproduction were selected suitably for each disk.

In the drawing, a curved line shown by "A" is a measured result of a conventional magneto-optical disk, its reproducing laser power was 1 mW and the magnetic field was not applied at the time of the reproduction.

The conventional magneto-optical disk is arranged such that AlN of 80 nm, DyFeCo of 20 nm, AlN of 25 nm and AlNi of 30 nm are laminated on a substrate in this order, and an over coat layer is provided onto the AlNi. In other words, the conventional magneto-optical disk is arranged such that it has only one DyFeCo magnetic layer that is rare earth transition metal alloy, and the both faces of the DyFeCo magnetic layer are sandwiched between AlNs, which are a transparent dielectric layer and a protective layer. Then, the conventional magneto-optical disk is finished such that AlNi which is a reflecting film is provided.

The above construction is called as reflecting film construction, and it is typical construction that is adopted into a single plate-type 3.5 inch magneto-optical disk on the market. In the conventional magneto-optical disk, the C/N is low in the case where the length of the recording bits is short. This is because as the bit length becomes smaller, a number Of bits existing in the light beam spot, so bits cannot be recognized separately.

One characteristic that represents optical resolution of an optical pick-up is cut-off spatial frequency. This is decided depending on the wavelength of a laser as a light source and the numerical aperture of an objective lens. The cut-off frequency is obtained according to the wavelength (780 nm) and the numerical aperture (0.55) of the optical pick-up used in this experiment, and the obtained cut-off frequency is converted into the length of the recording bit as follows:

780 nm/(2×0.55)/2=0.355 µm.

In other words, the limit of the optical resolution of the optical pick-up used in the experiment is 0.355 µm in the bit length. Accordingly, as to the measured result of the conventional magneto-optical disk, the C/N is approximately 0 when the bit length is 0.35 µm.

Meanwhile, in the magneto-optical disk of the present embodiment, when the thickness of the reproductive layer 3 is set so as to have a suitable value, the C/N value which is larger than that in the conventional magneto-optical disk can be obtained even in a shorter bit than 0.355 µm that is the limit of the optical resolution. As is clear from FIG. 5, when the thickness of the reproductive layer 3 is 40 nm to 120 nm, the more satisfactory signal quality can be obtained compared to the conventional magneto-optical disk. It is more desirable that the thickness of the reproductive layer 3 is 40 nm to 100 nm.

As is clear from the above description, when the thickness $h_1$ of the reproductive layer 3 is set to not less than 40 nm, the reproduction can be carried out by applying the external magnetic field of comparatively small value. Moreover, when the thickness of the reproductive layer 3 is set to 40 nm to 120 nm, the satisfactory quality of the reproductive signal can be obtained.

EMBODIMENT 2

Figure 6:
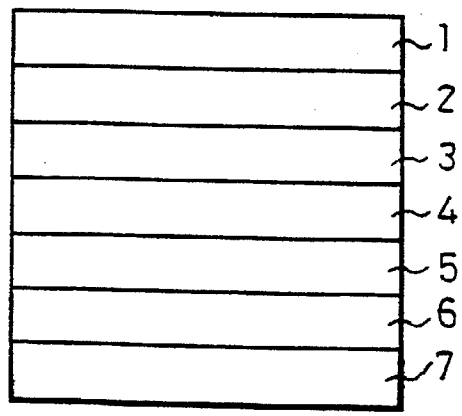
FIG. 6 is an explanatory drawing which shows a schematic arrangement of a magneto-optical disk having magnetic triple layers that are used in embodiments 3 through 5.

The following describes another embodiment of the present invention in reference to FIG. 6. Here, for convenience of explanation, those members that have the same arrangement and functions, and that are described in the aforementioned embodiment 1 are indicated by the same reference numerals and the description thereof is omitted.

According to the expression (5), it is clear that the strength of the magnetic domain wall energy σw in the interface at room temperature influences the external magnetic field to be applied at the time of the reproduction. Therefore, in order to investigate an influence of the magnetic domain wall energy σw, as shown in FIG. 6, a magneto-optical disk, which has an arrangement such that the substrate 1, the transparent dielectric layer 2, the reproductive layer 3, the intermediate layer 4, the recording layer 5, the protective layer 6 and the over coat layer 7 were laminated in this order, was produced.

GdFeCo rare earth transition metal alloy with compensation temperature of 180° C. and Curie temperature of 330° C. was used as the reproductive layer 3. Its film thickness was 50 nm. DyFeCo rare earth transition metal alloy with compensation temperature of room temperature and Curie temperature of 240° C. was used as the recording layer 5. Its film thickness was 50 nm. Moreover, similarly to embodiment 1, the transparent dielectric layer 2 made of AlN with a thickness of 70 nm and the protective layer 6 with a thickness of 50 nm that is a dielectric film made of AlN were used.

A GdFeCo rare earth transition metal alloy film with a thickness of 20 nm was inserted as the intermediate layer 4. A magneto-optical disk, in which the strength of the perpendicular magnetic anisotropy energy (Ku) in the intermediate layer 4 is varied and thus the magnetic domain wall energy σw(room temperature) of a magnetic domain wall formed between the reproductive layer 3 and the recording layer 5 is varied, was produced. TABLE 2 shows the values of the magnetic domain wall energy σw(room temperature), C/N in the bit length of 0.5 µm and the most suitable external magnetic field to be applied at the time of the reproduction. The measurement was taken by the same method as that of embodiment 1.

TABLE 2

| σw(room temperature) (J/m²) | C/N in bit length of 0.5 µm (dB) | Most suitable external magnetic field (Oe) |
| --- | --- | --- |
| $5 \times 10^{-5}$ | 35 | 0 |
| $8 \times 10^{-5}$ | 35 | 0 |
| $1 \times 10^{-4}$ | 46 | 300 |
| $4 \times 10^{-4}$ | 46 | 350 |
| $7 \times 10^{-4}$ | 46 | 400 |
| $1 \times 10^{-3}$ | 46 | 600 |
| $2 \times 10^{-3}$ | 46 | 800 |
| $5 \times 10^{-3}$ | 46 | 1200 |
| Normal magneto-optical disk | 35 | (0) |

According to TABLE 2, when the magnetic domain wall energy σw fulfills the following relationship:

$$1.0 \times 10^{-4} (J/m^2) \leq \sigma w(\text{room temperature}) \leq 1.0 \times 10^{-3} (J/m^2),$$

the most suitable external magnetic field becomes not more than 600 (Oe) that is comparatively small value, and the value of the C/N becomes larger than conventional magneto-optical disk. In other words, the resolution is improved. When σw(room temperature)≦8×10⁻⁵(J/m²), the resolution is not improved. When 2×10⁻³(J/m²)≦σw(room temperature), the most suitable external magnetic field becomes larger than 600 (Oe). Therefore, the external magnetic field to be applied can be decreased, and in order to increase the C/N, the magnetic domain wall energy should become as follows:

$$1.0 \times 10^{-4} (J/m^2) \leq \sigma w(\text{room temperature}) \leq 1.0 \times 10^{-3} (J/m^2).$$

EMBODIMENT 3

Figure 7:
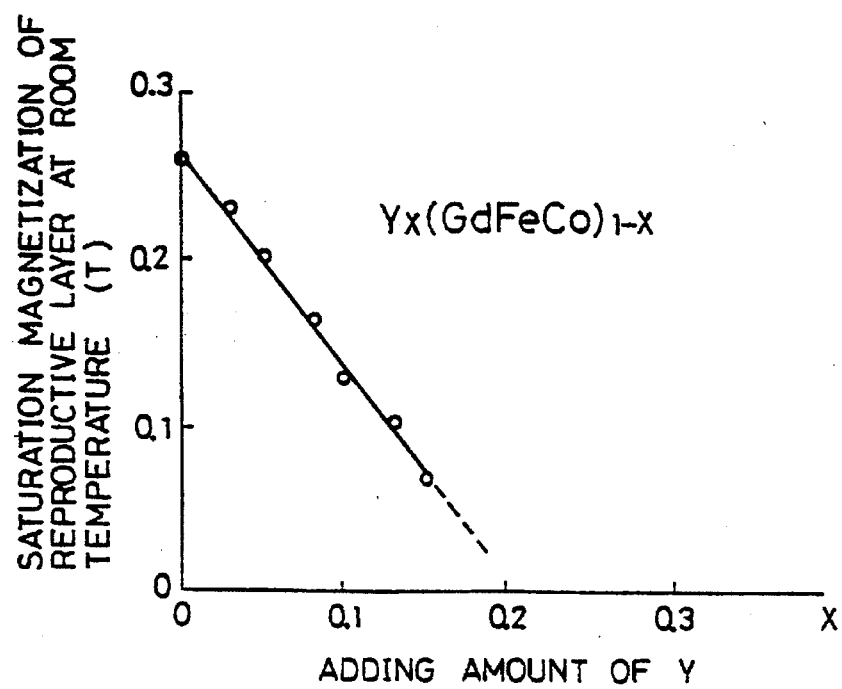
FIG. 7 is a graph which shows a relationship between an addition amount of Y to the reproductive layer and saturation magnetization of the reproductive layer at room temperature in embodiment 4.

The following describes another embodiment of the present invention in reference to FIGS. 6 and 7. Here, for convenience of explanation, those members that have the same arrangement and functions, and that are described in the aforementioned embodiments are indicated by the same reference numerals and the description thereof is omitted.

In order to investigate an influence which the saturation magnetization of the reproductive layer 3 at room temperature exerts upon the external magnetic field required for the reproduction, a magneto-optical disk having an arrangement shown in FIG. 6 was produced.

YGdFeCo rare earth transition metal alloy with compensation temperature of 180° C. was used as the reproductive layer 3. Its film thickness was 50 nm. When the composition of the reproductive layer 3 was YGdFeCo and Y that is non-magnetic rare earth metal was added thereto, the saturation magnetization at room temperature was changed without varying the compensation temperature.

DyFeCo rare earth transition metal alloy with compensation temperature of room temperature and Curie temperature of 240° C. was used as the recording layer 5. Its film thickness was 50 nm. Moreover, similarly to embodiment 1, the transparent dielectric layer 2 with thickness of 70 nm made of AlN and the protective layer 6 with thickness of 50 nm that is a dielectric film made of AlN were used.

A GdFeCo rare earth transition metal alloy film with thickness of 20 nm was inserted as the intermediate layer 4 between the reproductive layer 3 and the recording layer 5 so that magnetic domain wall energy σw(room temperature) =4×10⁻⁴(J/m²).

FIG. 7 shows a relationship between a value "x" and saturation magnetization at room temperature in YGdFeCo rare earth transition metal alloy represented by $Y_x(GdFeCo)_{1-x}$ as the reproductive layer 3. When an adding amount of Y, ie., an adding ratio is increased, the saturation magnetization of the reproductive layer 3 at room temperature becomes smaller.

TABLE 3 shows the value of the saturation magnetization of the reproductive layer 3 at room temperature, the C/N in the bit length of 0.5 μm and the most suitable external magnetic field to be applied at the time of the reproduction. The measurement was taken by the method same as that of embodiment 1.

TABLE 3

| Saturation Magnetization of reproductive layer at room temperature (T) | C/N in bit length of 0.5 μm (dB) | Most suitable external magnetic field (Oe) |
| --- | --- | --- |
| 0.26 | 46 | 350 |
| 0.23 | 46 | 350 |
| 0.20 | 46 | 300 |
| 0.16 | 46 | 300 |

TABLE 3-continued

| Saturation Magnetization of reproductive layer at room temperature (T) | C/N in bit length of 0.5 μm (dB) | Most suitable external magnetic field (Oe) |
| --- | --- | --- |
| 0.13 | 45 | 250 |
| 0.10 | 44 | 250 |
| 0.07 | 42 | 250 |

According to TABLE 3, when the saturation magnetization of the reproductive layer 3 at room temperature becomes not more than 0.2 (T), the most suitable external magnetic field can be reduced. Therefore, when the saturation magnetization $M_{S1}$ of the reproductive layer 3 at room temperature becomes as follows:

$$M_{S1} \leq 0.2 \ (T),$$

the external magnetic field to be applied can be further reduced. In addition, the value of C/N becomes smaller as the saturation magnetization of the reproductive layer 3 is reduced. This is considered because when the adding amount of Y is increased, the Curie temperature is lowered. According to TABLE 3, when $M_{S1} \geq 0.16$ (T), C/N becomes not less than 46 dB, namely, particularly satisfactory signal quality can be obtained. When the signal quality is not less than 45 dB, a magneto-optical disk having an error rate of approximately 1×10⁻⁵ can be obtained.

EMBODIMENT 4

Figure 8:
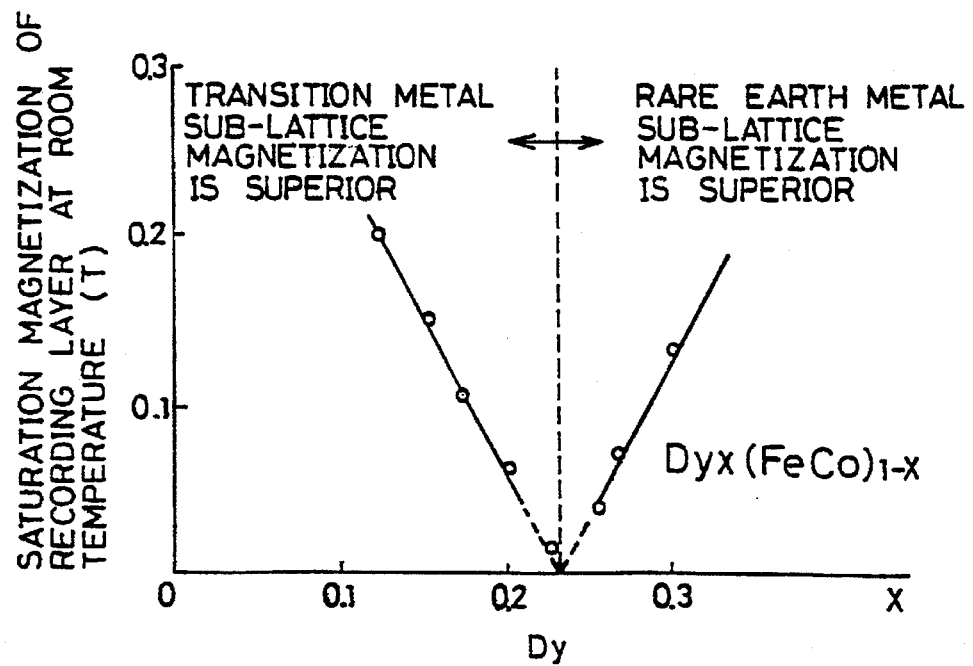
FIG. 8 is a graph which shows a relationship between composition and saturation magnetization of a recording layer at room temperature in embodiment 5.

The following describes another embodiment of the present invention in reference to FIGS. 6 and 8. Here, for convenience of explanation, those members that have the same arrangement and functions, and that are described in the aforementioned embodiments are indicated by the same reference numerals and the description thereof is omitted.

In order to investigate an influence which the saturation magnetization of the recording layer 5 at room temperature exerts upon an external magnetic field required for the reproduction, the magneto-optical disk having the arrangement shown in FIG. 6 was produced.

GdFeCo rare earth transition metal alloy with compensation temperature of 180° C. and Curie temperature of 330° C. which is a ferrimagnetic material was used as the reproductive layer 3. Its film thickness was 50 nm. DyFeCo rare earth transition metal alloy was used as the recording layer 5. Its film thickness was 50 nm. Moreover, similarly to embodiment 1, the transparent dielectric layer 2 with thickness of 70 nm made of AlN and the protective layer 6 with thickness of 50 nm which is a dielectric film made of AlN were used.

A GdFeCo rare earth transition metal alloy film with thickness of 20 nm was inserted as the intermediate layer 4 between the reproductive layer 3 and the recording layer 5 so that magnetic domain wall energy σw(room temperature) =4×10⁻⁴(J/m²).

FIG. 8 shows a relationship between a value "x" and the saturation magnetization at room temperature in the DyFeCo rare earth transition metal alloy represented by $Dy_x(FeCo)_{1-x}$ as the recording layer 5. According to FIG. 8, when x>0.23, rare earth metal sub-lattice magnetization is superior to transition metal sub-lattice magnetization, and when x<0.23, the transition metal sub-lattice magnetization is superior to the rare earth metal sub-lattice magnetization. TABLE 4 shows the value of the saturation magnetization of the recording layer 5 at room temperature, the type of the superior sub-lattice magnetization, the C/N in the bit length of 0.5 μm and the most suitable external magnetic field to be applied at the time of the reproduction. The measurement was taken by the method same as that of embodiment 1.

TABLE 4

| Saturation magnetization of recording layer at room temperature (T) | Superior sub-lattice magnetization | C/N in bit length of 0.5 μm (dB) | Most suitable external magnetic field (Oe) |
|---|---|---|---|
| 0.20 | Transition metal | 42 | 200 |
| 0.15 | Transition metal | 44 | 200 |
| 0.11 | Transition metal | 46 | 250 |
| 0.06 | Transition metal | 46 | 300 |
| 0.03 | Transition metal | 46 | 350 |
| 0.00 | — | 46 | 350 |
| 0.04 | Rare earth metal | 46 | 400 |
| 0.07 | Rare earth metal | 46 | 500 |
| 0.13 | Rare earth metal | 46 | 700 |

As is clear from TABLE 4, in the recording layer 5, when the transition metal sub-lattice magnetization is superior to the rare earth metal sub-lattice magnetization at room temperature and when the value of the saturation magnetization of the recording layer 5 at room temperature becomes not less than 0.06 (T), the most suitable external magnetic field can be reduced. When the value of the saturation magnetization becomes not less than 0.15 (T), the C/N value becomes smaller. This is because a Kerr hysteresis loop gets out of shape in the vicinity of the Curie temperature in the recording layer 5.

As mentioned above, when the transition metal sub-lattice magnetization is superior to the rare earth metal sub-lattice magnetization of the recording layer 5 at room temperature and when the value of saturation magnetization $M_{S2}$ of the recording layer 5 at room temperature becomes not less than 0.06 (T), the external magnetic field to be applied can be made smaller. Moreover, according to TABLE 4, when the transition metal sub-lattice magnetization of the recording layer 5 is superior to the rare earth metal sub-lattice magnetization at room temperature and when the value of the saturation magnetization of the recording layer 5 at room temperature becomes not more than 0.11 (T), the value of the C/N becomes not less than 46 dB, so particularly satisfactory signal quality can be obtained.

EMBODIMENT 5

The following describes another embodiment of the present invention in reference to FIG. 6. Here, for convenience of explanation, those members that have the same arrangement and functions, and that are described in the aforementioned embodiments are indicated by the same reference numerals and the description thereof is omitted.

As described in embodiments 3 and 4, the values of each saturation magnetization of the reproductive layer 3 and the recording layer 5 at room temperature exert an influence upon the external magnetic fields required for the reproduction. Therefore, in order to investigate influences when the values of the saturation magnetization of the reproductive layer 3 and the recording layer 5 at room temperature are simultaneously varied, a magneto-optical disk having the arrangement shown in FIG. 6 was produced.

YGdFeCo rare earth transition metal alloy, in which the compensation temperature is 180° C. and saturation magnetization at room temperature is 0.16 (T), was used as the reproductive layer 3. Its film thickness was 50 nm.

DyFeCo rare earth transition metal alloy, in which the transition metal sub-lattice magnetization is superior at room temperature and the saturation magnetization at room temperature is 0.11 (T), was used as the recording layer 5. Its film thickness was 50 nm.

In addition, similarly to embodiment 1, the transparent dielectric layer 2 with thickness of 70 nm made of AlN and the protective layer 6 with thickness of 50 nm which is a dielectric film made of AlN were used.

A GdFeCo rare earth transition metal alloy film with thickness of 20 nm was inserted as the intermediate layer 4 between the reproductive layer 3 and the recording layer 5 so that magnetic domain wall energy σw(room temperature) $=4\times10^{-4}(J/m^2)$.

TABLE 5 shows the C/N in the bit length of 0.5 μm and the most suitable external magnetic field to be applied at the time of the reproduction. The measurement was taken by the method same as that of embodiment 1.

TABLE 5

| C/N in bit length of 0.5 μm (dB) | Most suitable external magnetic field (Oe) |
|---|---|
| 46 | 150 |

According to TABLE 5, the most suitable external magnetic field becomes 150 (Oe) under the above condition, so it was smaller than those in embodiments 1 through 4. Moreover, the value of C/N was also larger. As a result, when the condition of the saturation magnetization of the reproductive layer 3 at room temperature and the condition of the saturation magnetization of the recording layer 5 at room temperature described in embodiments 3 and 4 are simultaneously fulfilled, the external magnetic field to be applied can be further reduced.

In each embodiment, the composition, thickness, type of metal alloy, etc. of the reproductive layer 3, intermediate layer 4 and recording layer 5 are not necessarily limited to the above examples. As to the rare earth transition metal alloy, when the ratio of rare earth metal to transition metal is changed, the coercive force, the strength of magnetization and the magnetic domain wall energy in the interface are greatly changed. For this reason, when the ratio of rare earth metal to transition metal in GdFeCo, YGdFeCo and DyFeCo is changed, the compensation temperature, magnetic domain wall energy and saturation magnetization are also changed accordingly.

In addition, when the ratio of rare earth metal to transition metal in the rare earth transition metal alloy is changed, the compensation temperature, that balances the magnetization of rare earth metal and the magnetization of transition metal, is changed, so GdDyFeCo, NdGdFeCo, GdCo, etc. can be also used as the reproductive layer 3 instead of GdFeCo and YGdFeCo. Moreover, TbFeCo, GdTbFe, GdTbFeCo, GdDyFeCo, NdGdFeCo, etc. can be also used as the recording layer 5 instead of DyFeCo.

As to YGdFeCo used as the reproductive layer 3, Y is added in order to adjust the saturation magnetization, but the saturation magnetization is reduced also by adding non-magnetic metal and Ni. Therefore, they can be added instead of Y.

As to GdFeCo used as the intermediate layer 4, another rare earth transition metal alloy and one to which additional element is added can be used. Moreover, it is possible to use magnetic multi-layers, that are magnetic double-layers in appearance, which are formed by continuously changing the composition in the direction of the film thickness, thereby making it possible to adjust the magnetic domain wall energy in the interface.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium, comprising:

magnetic multi-layers including a reproductive layer, which is a magnetic layer having perpendicular magnetic anisotropy, for reading out magneto-optically recorded information and a recording layer, which is a magnetic layer having perpendicular magnetic anisotropy, for magneto-optically recording information, wherein the following conditions are fulfilled:

$$H_{C1}(ta)+\sigma w(ta)/2M_{S1}(ta)h_1$$

$$<-H_{C1}(t)+\sigma w(t)/2M_{S1}(t)h_1, \text{ and}$$

$$40(nm) \leq h_1 \leq 120(nm)$$

where $h_1$ is the thickness of said reproductive layer, $H_{C1}(ta)$ is coercive force of said reproductive layer at room temperature (ta), $M_{S1}(ta)$ is saturation magnetization of said reproductive layer at room temperature (ta), $M_{S2}(ta)$ is saturation magnetization of said recording layer at room temperature (ta), $\sigma w(ta)$ is magnetic domain wall energy of a magnetic domain wall formed between said reproductive layer and said recording layer at room temperature (ta), $H_{C1}(t)$ is coercive force of said reproductive layer at a temperature (t) of not lower than a certain temperature (tm) that is higher than room temperature, $M_{S1}(t)$ is saturation magnetization of said reproductive layer at a temperature (t) of not lower than a certain temperature (tm) that is higher than room temperature, $M_{S2}(t)$ is saturation magnetization of said recording layer at a temperature (t) of not lower than a certain temperature (tm) that is higher than room temperature, and $\sigma w(t)$ is magnetic domain wall energy of a magnetic domain wall formed between said reproductive layer and said recording layer at a temperature (t) of not lower than a certain temperature (tm) that is higher than room temperature.

2. The magneto-optical recording medium as defined in claim 1, wherein the following condition is fulfilled:

$$1 \times 10^{-4}(J/m^2) \leq \sigma w(ta) \leq 1 \times 10^{-3}(J/m^2).$$

3. The magneto-optical recording medium as defined in claim 1, wherein the following condition is fulfilled:

$$M_{S1}(ta) \leq 0.2(T).$$

4. The magneto-optical recording medium as defined in claim 3, wherein the following condition is fulfilled:

$$M_{S1}(ta) \geq 0.16(T).$$

5. The magneto-optical recording medium as defined in claim 1, wherein:

said recording layer has composition that transition metal sub-lattice magnetization is superior to rare earth metal sub-lattice magnetization at room temperature, the following condition is fulfilled:

$$M_{S2}(ta) \geq 0.06(T).$$

6. The magneto-optical recording medium as defined in claim 5, wherein the following condition is fulfilled:

$$M_{S2}(ta) \leq 0.11(T).$$

7. The magneto optical recording medium as defined in claim 1, wherein:

said recording layer has composition that transition metal sub-lattice magnetization is superior to rare earth metal sub-lattice magnetization at room temperature, the following conditions are fulfilled:

$$M_{S1}(ta) \leq 0.2(T); \text{ and}$$

$$M_{S2}(ta) \geq 0.06(T).$$

8. The magneto-optical recording medium as defined in claim 7, wherein the following conditions are fulfilled:

$$M_{S1}(ta) \geq 0.16(T); \text{ and}$$

$$M_{S2}(ta) \leq 0.11(T).$$

* * * * *